United States Patent [19]

Whitesel

[11] Patent Number: 4,689,784

[45] Date of Patent: Aug. 25, 1987

[54] DATA DISTRIBUTOR CAPABLE OF SELECTING AN OPTIONAL PARTIAL DATA SIGNAL AND DISTRIBUTION DEVICE COMPRISING A PLURALITY OF THE DATA DISTRIBUTORS

[76] Inventor: J. Warren Whitesel, c/o NEC Corporation, 33-1, Shiba 5-chome, Minato-ku, Tokyo, Japan

[21] Appl. No.: 802,035

[22] Filed: Nov. 26, 1985

[30] Foreign Application Priority Data

Nov. 27, 1984 [JP] Japan ............................... 59-251255

[51] Int. Cl.$^4$ ............................................. H04J 3/04
[52] U.S. Cl. ..................................... 370/58; 370/112
[58] Field of Search .................... 370/58, 93, 104, 112

[56] References Cited

U.S. PATENT DOCUMENTS 4,377,861  3/1983  Huffman .............................. 370/112

*Primary Examiner*—Douglas W. Olms
*Assistant Examiner*—Kenneth I. Rokoff

[57] ABSTRACT

In a data distributor for distributing an output data signal to an output port in response to an input data signal divisible into a plurality of channel signals arranged in channels, respectively, a position number signal is specific to a position of the data distributor and converted by a converting unit into a specific channel number signal representative of a specific one of the channels. The specific channel number signal is compared by a comparator with each channel number signal received in synchronism with the channel signals, to detect coincidence therebetween. On detection of coincidence, an AND gate allows a part of the input data signal to pass therethrough as the output data signal. The specific channel number signal is produced by comparing the position number signal with a sequence of port number signals given from a first signal source and representative of each output port and by loading a memory unit with one of internal channel number signals sent from a second signal source, in response to a result of comparison. The one of the internal channel number signal is delivered as the specific channel number signal to the comparator.

4 Claims, 6 Drawing Figures

4,689,784

DATA DISTRIBUTOR CAPABLE OF SELECTING AN OPTIONAL PARTIAL DATA SIGNAL AND DISTRIBUTION DEVICE COMPRISING A PLURALITY OF THE DATA DISTRIBUTORS

BACKGROUND OF THE INVENTION

This invention relates to a data distributor for use in a time division multiple access network and to a distribution device comprising a plurality of the data distributors.

In general, a plurality of data distributors are arranged in rows and columns in a housing or frame of a distribution device. The data distributors are given position signals determined by positions of the data distributors in the distribution device. The position signals are made to correspond to distributor numbers assigned to the data distributors and may be called distributor number signals representative of the distributor numbers.

The data distributors are supplied with an input data signal which is multiplexed in a time division fashion and which is divisible into a plurality of partial or channel data signals assigned to a plurality of channels, namely, time slots, respectively. A sequence of channel number signals is also given to the data distributors in synchronism with the corresponding partial data signals so as to specify the channels for the respective partial data signals.

As will later be described with reference to a few figures of the accompanying drawing, a conventional distribution device comprises a plurality of data distributors each of which compares the position signal assigned to the data distributor with the channel number signal sequence to produce an enable signal on coincidence between the assigned position signal and one of the channel number signals. The data distributor allows a part of the input data signal to pass therethrough during presence of the enable signal and distributes the part of the input data signal to an output port thereof as an output data signal.

In the conventional distribution device, let one of the data distributors distribute one of the partial data signals for a preselected one of the channels and be stalled for same reason or other. In order to avoid interruption of distribution, it may be considered that a spare data distributor is prepared in the distribution device and substitutes distribution of the one partial data signal for the one data distributor. For this purpose, the spare data distributor should be supplied with one of the position signals assigned to the one data distributor. However, the position signals are determined by the positions of the data distributors and are therefore invariable in the respective data distributors.

This means that the channel number signals must be altered so as to carry out substitution of the data distributors. Alteration of the channel number signals is practically difficult in the conventional distribution device, as will later be described. Accordingly, interruption of distribution is inevitable when the data distributor or distributors are stalled.

Thus, the position signals are made to correspond to the channels of the input data signal, respectively, and are representative of positions, namely, spaces for the respective data distributors. Taking this into consideration, it is assumed that an idle channel is included in the channels. In this case, an unused one of the spaces must be left for the idle channel in the distribution device despite the fact that no data distributor may be accommodated in the useless space. Therefore, the conventional distribution device becomes uselessly bulky in structure.

SUMMARY OF THE INVENTION

It is an object of this invention to provide a data distributor which can select and distribute an optional one of partial or channel data signals.

It is another object of this invention to provide a data distributor of the type described, which can avoid interruption of distribution.

It is still another object of this invention to provide a distribution device which can remove an unused space and is therefore small in size.

A data distributor to which this invention is applicable is for distributing an output data signal to an output port in response to an input data signal divisible into a plurality of partial data signals which are assigned to a plurality of time slots, respectively. The data distributor is supplied with a position signal determined by a position of the data distributor and a sequence of time slot number signals representative of numbers given to the respective time slots. The time slot number signals are synchronized with the corresponding partial data signals, respectively. According to this invention, the data distributor comprises signal converting means for converting the position signal into a specific time slot number signal representative of a specific one of the time slots, comparing means for comparing the specific time slot number signal with the time slot number signal sequence to produce an enable signal when the specific time slot is indicated by the time slot number signal sequence, and extracting means for extracting a specific one of the partial data signals from the input data signal in response to the enable signal to produce the specific partial data signal as the output data signal.

DESCRIPTION OF THE PREFERRED EMBODIMENTS

Figure 1:
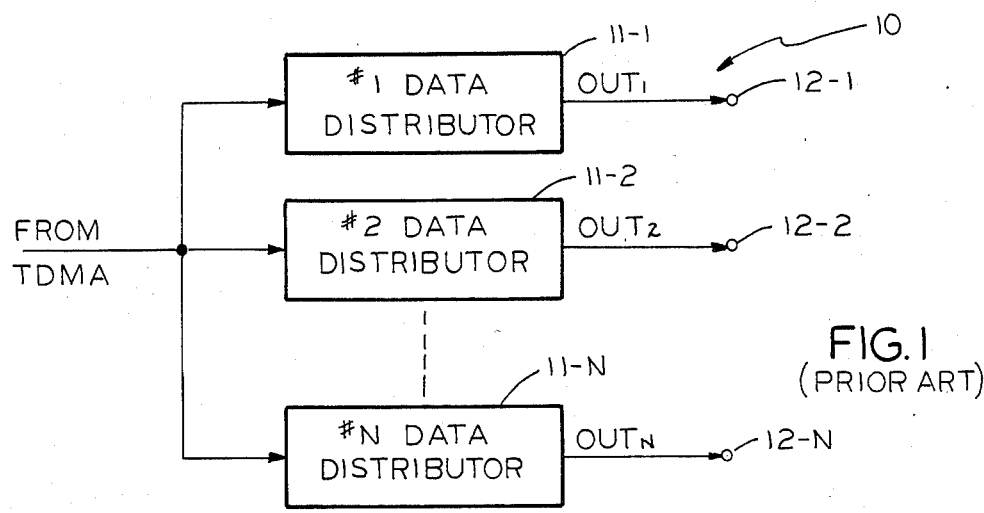
FIG. 1 is a block diagram of a conventional distribution device.
Figure 2:
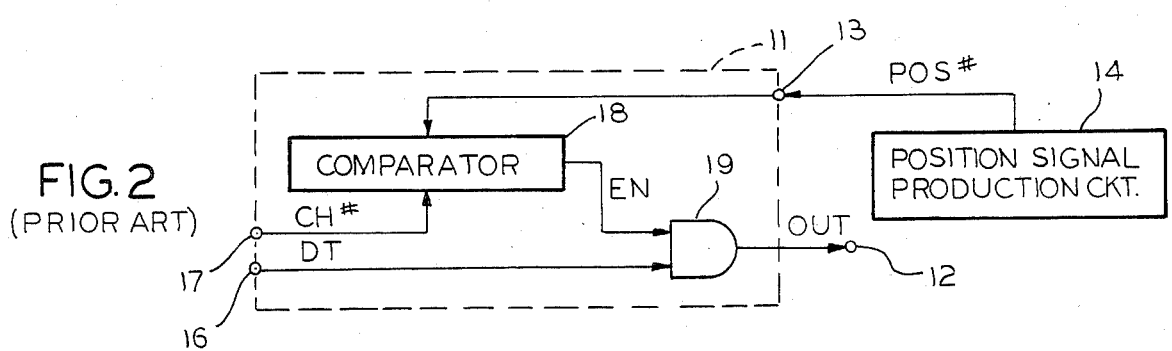
FIG. 2 is a block diagram of a conventional data distributor for use in the distribution device illustrated in FIG. 1.
Figure 3:
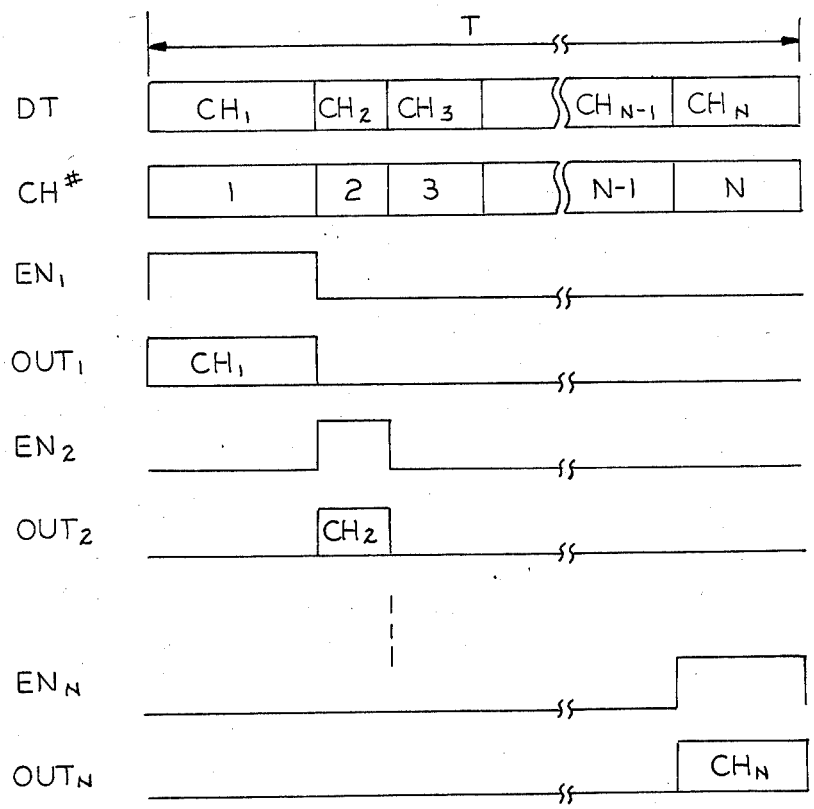
FIG. 3 is a time chart for use in describing operation of the distribution device illustrated in FIG. 1.

Referring to FIGS. 1 through 3, a conventional distribution device 10 has a plurality of positions, N in number, and comprises first through N-th data distributors 11-1 to 11-N placed at the respective positions, as shown in FIG. 1. Practically, the distribution device comprises a housing (not shown) which surrounds an internal space and a plurality of shelves (not shown) dividing the internal space into partial internal spaces. Each partial internal space is partitioned into a plurality of unit spaces for accommodating the data distributors, respectively. In this connection, the unit spaces may be made to correspond to the positions and are given addresses particular to the unit spaces, respectively. Thus, the addresses are representative of the positions, respectively.

The first through N-th data distributors 11-1 to 11-N are coupled to a time division multiple access (TDMA) device (not shown) in common and distribute first through N-th output signals OUT#1 to OUT#N to first through N-th output ports 12-1 to 12-N, respectively. The first through N-th output signals OUT#1 to OUT#N may be individually sent to data interpolators or the like.

In FIG. 2, each of the first through N-th data distributors 11 (suffixes omitted) has a position number input terminal 13 which is supplied with a position signal POS# which is indicative of a position number given to each unit space and will therefore be called a position number signal. The position number signal POS# is supplied from a position signal production circuit 14 composed of a plurality of switches each of which is closed and opened so as to represent logic "0" and logic "1" levels, respectively, and to specify the position number of each unit space.

The data distributor 11 has first and second input terminals 16 and 17 connected to the TDMA device. The first input terminal 16 is given an input data signal DT divided into a sequence of frames each of which has a frame period T, as shown along a top line of FIG. 3. Each frame is subdivided into first through N-th channel data signals $CH_1$ to $CH_N$ which are placed at first through N-th channels, respectively, and which may be referred to as partial data signals. Anyway, the input data signal DT is multiplexed in a time division fashion. For simplicity of description, the position number signals POS# of the first through N-th distributors 11-1 to 11-N are assumed to correspond to the first through N-th channels, respectively, and also to correspond to the first through N-th output ports 12-1 to 12-N, respectively.

The second input terminal 17 is supplied from the TDMA device with a sequence of channel number signals CH# which are representative of channel numbers, such as 1, 2, ..., N, assigned to the first through N-th channels, respectively. As shown along a second line in FIG. 3, the channel number signals CH# for the first through N-th channels are synchronized with the first through N-th channel data signals $CH_1$ to $CH_N$, respectively, and lasts during the first through N-th channels, respectively.

In FIG. 2, the data distributor 11 comprises a comparator 18 for comparing the position number signal POS# with the channel number signal sequence CH# to produce an enable signal EN of the logic "1" level on coincidence between the position number signal POS# and one of the channel number signal sequence CH#.

The enable signal EN is sent to an AND gate 19 given the input data signal DT to select a single channel of the input data signal DT that corresponds to the position number signal POS#.

When the distributor 11 illustrated in FIG. 2 is used as the first data distributor 11-1, the enable signal EN appears as a first enable signal for a duration of the first channel, as depicted at $EN_1$ along a third line of FIG. 3. As a result, the first channel data signal $CH_1$ is selected by the first distributor 11-1 and distributed to the first output port 12-1 as the first output signal OUT#1, as depicted along a fourth line of FIG. 3.

When such distributors 11 illustrated in FIG. 2 are used as the second through N-th data distributors 11-2 to 11-N, the enable signals EN are produced for durations of the second through N-th channels, as depicted at $EN_2$ through $EN_N$ in FIG. 3. The second through N-th channel data signals $CH_2$ to $CH_N$ are distributed as the second through N-th output signals OUT#2 to OUT#N to the second through N-th output ports 12-2 to 12-N, respectively.

With this structure, the position number signals POS# are peculiar to the unit spaces, namely, the positions and can not be changed. This means that the channel number signals CH# should be altered so as to distribute another channel data signal different from the channel data signal predetermined therefor to each output port 12. Inasmuch as the channel number signals CH# are synchronized with the corresponding channel data signals, such as $CH_1$, $CH_2$, ..., $CH_N$, alteration of the channel numbers represented by the channel number signals CH# inevitably results in alteration of a format of the input data signal DT as illustrated in FIG. 3. This requires a change of a communication network as a whole.

Under the circumstances, the channel numbers are usually invariable once the format of the frame is determined. In any event, alteration of the channel numbers is practically difficult in the conventional distribution device illustrated in FIGS. 1 and 2, as mentioned in the preamble of the instant specification.

In addition, an idle one of the unit spaces must remain in the distribution device even when an idle channel is included in the first through N-th channels, as described before.

Figure 4:
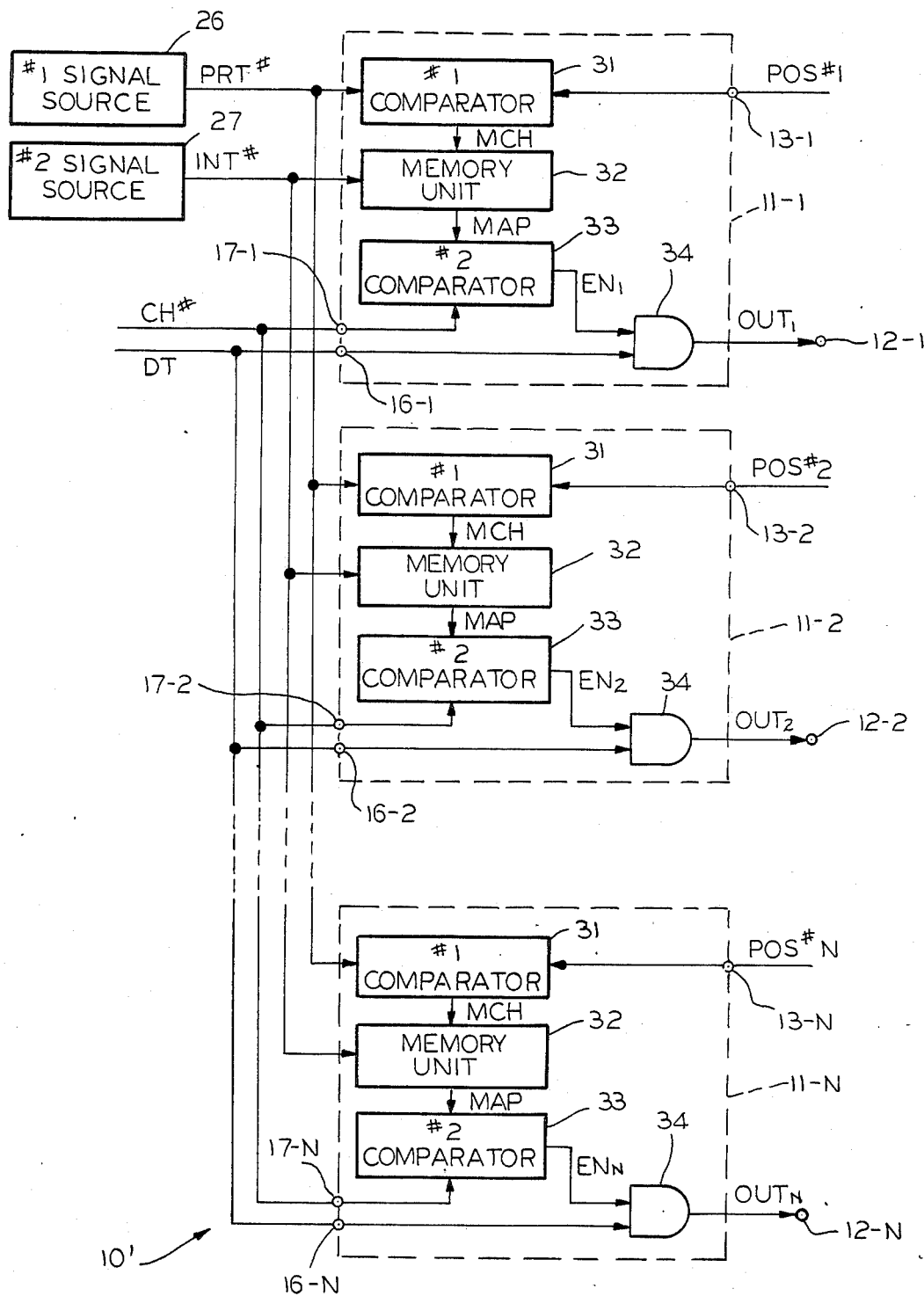
FIG. 4 is a block diagram of a distribution device according to a preferred embodiment of this invention.

Referring to FIG. 4, a distribution device 10' according to a preferred embodiment of this invention comprises similar parts designated by like reference numerals. Like in FIG. 1, the distribution device 10' comprises first through N-th data distributors 11-1 to 11-N which are supplied with the input data signal DT and the channel number signal sequence CH# in the manner mentioned in conjunction with FIGS. 1 and 2. The input data signal DT is delivered to the first input terminals 16-1 through 16-N of the respective data distributors 11-1 to 11-N while the channel number signal sequence CH# is delivered to the second input terminals 17-1 to 17-N. In addition, the data distributors 11-1 through 11-N have the position number input terminals 13-1 to 13-N which are supplied with the position number signals POS# peculiar to the respective data distributors 11-1 to 11-N. The data distributors 11-1 to 11-N further have the first through N-th output ports 12-1 to 12-N for the first through N-th output signals OUT#1 to OUT#N, respectively. It is assumed that output port numbers assigned to the output ports 12-1 to 12-N are made to correspond to the first through N-th channels, respectively.

Each of the first through N-th data distributors 11 is similar in structure and operation to one another. Accordingly, description will be mainly made about the first data distributor 11-1.

Figure 5:
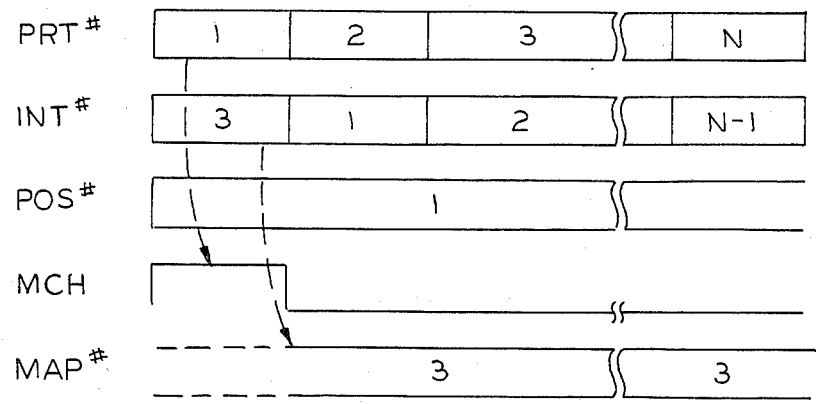
FIG. 5 is a time chart for use in describing operation of a data distributor illustrated in FIG. 4.

Referring to FIG. 5 together with FIG. 4, the distribution device 10 comprises a first signal source 26 and a second signal source 27 both of which may be collectively called a signal oscillation circuit. The first signal source 26 produces a sequence of port number signals PRT# representative of the first through N-th output ports 12-1 to 12-N, respectively. As illustrated along a top line of FIG. 5, the port number signal sequence PRT# is produced in a time division fashion. Each of the port number signals PRT# lasts for a duration assigned to each channel and therefore defines each channel, as will become clear later. It is to be noted here that the first through N-th output ports 12-1 to 12-N are consecutively indicated by the port number signal sequence PRT# as the first one to the N-th one.

On other hand, the second signal source 27 produces a sequence of internal channel number signals INT# as shown along a second line of FIG. 5. The internal channel number signals INT# may alternatively be named map number signals, as will become clear as the description proceeds, and are representative of internal channel numbers determined in the distributor device 10. The internal channel numbers may optionally be determined in each of the data distributors 11-1 to 11-N. In the example being illustrated, the internal channel number signals INT# indicate the internal channel numbers in the order of 3, 1, 2, ..., N−1. Anyway, the internal channel number signals IT# are produced in synchronism with the port number signals PRT# in a time division fashion and may indicate channel numbers different from the port number signals PRT#.

Now, operation will be described about the first data distributor 11-1 with reference to FIGS. 4 and 5. The position number input terminal 12-1 of the first data distributor 11-1 is given a first one of the position number signals POS# that is indicative of the number "1", as shown along a third line of FIG. 5, and which is delivered through the position number input terminal 12-1 to a first comparator 31. The position number signal POS#1 for the first data distributor 11-1 will be called a first position number signal and may be represented by POS#1. The comparator 31 compares the first position number signal POS#1 with the port number signals PRT# to produce a coincidence signal MCH on coincidence between the first position number signal POS#1 and one of the port number signal PRT#, as illustrated along a fourth line of FIG. 5.

The coincidence signal MCH is delivered to a memory unit 32. Responsive to the coincidence signal MCH, the memory unit 32 is put into an enable state and is loaded with one of the internal channel number signals INT# that is received during the coincidence signal MCH. In FIG. 5, the channel number "3" is indicated by the internal channel number signal INT# while the coincidence signal MCH is produced by the first comparator 31. Therefore, the channel number "3" is memorized in the memory unit 32 as a specific channel number signal. Therefore, the specific channel number signal is representative of a third one "3" of the channels.

Thus, a combination of the first comparator 31 and the memory unit 32 serves to convert each position number signal POS# into a specific channel number signal which may be different from the position number signal POS# assigned to each data distributor 11. Therefore, the combination of the first comparator 31 and the memory unit 32 may be referred to as a converting circuit. In this connection, the specific channel number signal will be called a mapped channel number signal MAP# in the manner mentioned before.

In FIG. 5, the channel number "3" is fixedly or repeatedly produced as the mapped channel number signal MAP# by the memory unit 32 of the first data distributor 11-1 at every channel, as illustrated along a fifth line of FIG. 5.

Figure 6:
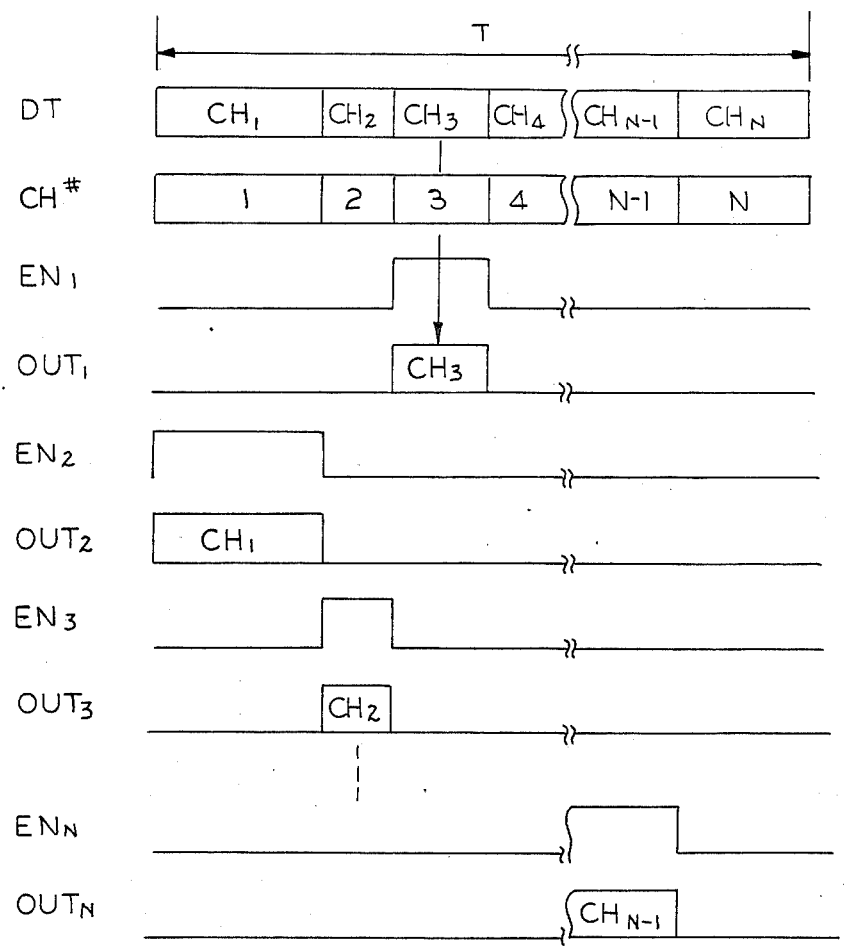
FIG. 6 is a time chart for use in describing operation of the distribution device illustrated in FIG. 4.

Referring to FIG. 6 afresh and FIG. 4 again, a second comparator 33 compares the mapped channel number signal MAP# with the channel number signal sequence CH# supplied from the TDMA device. In the first data distributor 11-1, the channel number "3" indicated by the mapped channel number signal MAP# is compared by the second comparator 33 with each channel number indicated by the channel number signal sequence CH#.

As illustrated in FIG. 6, the channel numbers indicated by the channel number signals CH# are successively changed from the number "1" to the number "N" in synchronism with the respective channel signals of the input data signal DT.

Under the circumstances, the second comparator 33 of the first data distributor 11-1 detects no coincidence between the mapped channel number signal MAP# and the channel number signals CH# during the first channel indicated by the first position number signal POS#1. Therefore, no enable signal is sent from the second comparator 33 to an AND gate 34 supplied with the input data signal DT.

As shown in FIG. 6, the second comparator 33 of the first data distributor 11-1 detects coincidence between the mapped channel number signal MAP# and the channel number signals CH# during the third channel indicated by the channel number "3." As a result, the second comparator 33 delivers a first enable signal $EN_1$ to the AND gate 34 during the third channel, as shown along a third line of FIG. 6. Therefore, the third channel data signal $CH_3$ is selected by the AND gate 34 of the first data distributor 11-1 to be distributed to the first output port 12-1 as the first output signal OUT#1, as illustrated in FIG. 6.

The remaining data distributors 11-2 to 11-N are similar in structure to that of the first data distributor 11-1. Therefore, each of the remaining data distributors comprises the first and second comparators 31 and 33, the memory unit 32, and the AND gate 34.

Operation of the second data distributor 11-2 is similar to that of the first data distributor 11-1 except that the second data distributor 11-2 is supplied with a second one (POS#2) of the position number signals POS# and a second one of the port number signals PRT# and is operable to distribute the first channel data signal $CH_1$ to the second output port 12-2, as will readily be understood from FIG. 5. As a result, the second comparator 33 produces a second enable signal $EN_2$ during the first channel, as shown in FIG. 6. The first channel data signal $CH_1$ is therefore derived through the AND gate 34 of the second data distributor 11-2 to be delivered to the second output terminal 12-2 as the second output signal OUT#2, as illustrated in FIG. 6.

The third data distributor 11-3 distributes the second channel data signal $CH_2$ to the third output port 12-3 as the third output signal OUT# 3 in a manner similar to that described in conjunction with the first and second data distributors 11-1 and 11-2.

Likewise, the N-th data distributor 11-N is operated to select the (N−1)-th channel data signal as the N-th output signal OUT#N in the example being illustrated in FIGS. 5 and 6.

Thus, each data distributor selects the channel data signal indicated by the internal or mapped channel number signals INT# or MAP#. The internal number signals INT# may be determined regardless of the port number signals PRT#.

The memory units 32 of the respective data distributors 11-1 to 11-N store the mapped or specific channel number signals which are invariable as long as the internal channel number signals INT# are unchanged. In other words, the channel data signals distributed to the respective output ports can be changed by altering the internal channel number signals INT#.

With this structure, the distribution device can optionally determine the channel data signals distributed to the respective output ports by altering the internal channel number signals. This means that it is possible to remove any useless space in the distribution device when an idle channel is present in the input data signal DT. In addition, it is possible to prepare a spare data distributor and to rapidly substitute the spare data distributor for a faulty one of the data distributors. Accordingly, interruption of the distribution can be rapidly restored in the distribution device. Such rapid restoration of the interruption results in an improvement of reliability in communication.

While this invention has thus far been described in conjunction with a preferred embodiment thereof, it will readily be possible for those skilled in the art to put this invention into practice as various other embodiments. For example, the input data signal DT may be given in a burst signal mode or a continuous signal mode. The distribution device may be used to successively and partially select the input data signal DT. In addition, a combination of the port number signals PRT# and the internal channel number signals INT# may be successively produced in a time division fashion. In this event, each data distributor may comprise a serial to parallel converter for converting a serial signal into a parallel signal. Finally, the distribution device may comprise a single data distributor as illustrated in FIG. 4.

What is claimed is:

1. A data distributor for distributing an output data signal to an output port in response to an input data signal divisible into a plurality of partial data signals which are assigned to a plurality of time slots, respectively, said data distributor being supplied with a position signal determined by a position of said data distributor and a sequence of time slot number signals representative of numbers given to the respective time slots, said time slot number signals being synchronized with the corresponding partial data signals, respectively, wherein the improvement comprises:

signal converting means for converting said position signal into a specific time slot number signal representative of a specific one of said time slots;

comparing means for comparing said specific time slot number signal with said time slot number signal sequence to produce an enable signal when said specific time slot is indicated by said time slot number signal sequence; and extracting means for extracting a specific one of said partial data signals from said input data signal in response to said enable signal to produce said specific partial data signal as said output data signal.

2. A data distributor as claimed in claim 1, wherein said signal converting means comprises:

time slot determining means responsive to said distributor number signal for determining a local time slot particular to said data distributor;

delivering means enabled during said local time slot for delivering said specific time slot number signal to said comparing means.

3. In a distribution device having a plurality of positions and comprising a plurality of data distributors which are placed at the positions and which are assigned with position signals determined by the positions, each of said data distributors having an output port and being for distributing an output data signal to said output port in response to an input data signal divisible into a plurality of partial data signals which are assigned to a plurality of time slots, respectively, said each data distributor being supplied with a sequence of time slot number signals which are representative of numbers given to the respective time slots and which are synchronized with the partial data signals, respectively, the improvement wherein said distribution device comprises:

signal producing means successively producing a sequence of port number signals representative of port numbers assigned to the respective output ports together with a sequence of internal time slot number signals representative of internal time slot numbers assigned to the respective data distributors, said port number signals being made to correspond to the respective position signals and to the respective internal time slot number signals;

said each data distributor comprising:

first comparison means for comparing said port number signal sequence with the position signal assigned to said each data distributor to determine a local time slot particular to said each data distributor;

memory means coupled to said first comparison means and said signal producing means for memorizing a specific one of said internal time slot number signals that appears during said local time slot and that is representative of a specific one of said internal time slots, to repeatedly produce said one of the internal time slot number signals as a specific time slot number signal;

second comparison means for successively comparing said specific time slot number signal with said time slot number signal sequence to produce an enable signal when said specific internal time slot is indicated by said time slot number signals; and extracting means for extracting a specific one of said partial data signals from said input data signal in response to said enable signal to produce said specific one of the partial data signals as said output data signal.

4. A distribution device as claimed in claim 3, wherein said signal producing means comprises:

first signal producing means for successively producing said port number signal sequence in a time division fashion; and second signal producing means for producing said internal time slot number signals in synchronism with the respective port number signals.

* * * * *

UNITED STATES PATENT AND TRADEMARK OFFICE
CERTIFICATE OF CORRECTION

PATENT NO. : 4,689,784
DATED : August 25, 1987
INVENTOR(S) : Takeshi Negishi

It is certified that error appears in the above—identified patent and that said Letters Patent is hereby corrected as shown below:

On the Title Page, Item [19] "Whitesel" should read -- Negishi --.

Item [76] Inventor: should read -- Takeshi Negishi --.

Signed and Sealed this

Fifth Day of April, 1988

*Attest:*

DONALD J. QUIGG

*Attesting Officer*   *Commissioner of Patents and Trademarks*